US012633766B2

(12) United States Patent
Hua et al.

(10) Patent No.: US 12,633,766 B2
(45) Date of Patent: May 19, 2026

(54) POWER SUPPLY METHOD, DEVICE, AND EQUIPMENT THEREOF

(71) Applicant: Lenovo (Beijing) Limited, Beijing (CN)

(72) Inventors: Guofu Hua, Beijing (CN); Wenping Yang, Beijing (CN); Qiming Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 63 days.

(21) Appl. No.: 18/896,380

(22) Filed: Sep. 25, 2024

(65) Prior Publication Data

US 2025/0105647 A1    Mar. 27, 2025

(30) Foreign Application Priority Data

Sep. 27, 2023    (CN) .......................... 202311268054.1

(51) Int. Cl.
H02J 1/08        (2026.01)
H02J 7/00        (2026.01)
(52) U.S. Cl.
CPC ............ H02J 7/00712 (2020.01); H02J 1/08 (2013.01)
(58) Field of Classification Search
CPC ...... H02J 7/00712; H02J 1/08; H02J 7/00714; G06F 1/263
See application file for complete search history.

(56) References Cited

U.S. PATENT DOCUMENTS

| | | | | |
|---|---|---|---|---|
| 5,991,839 A * | 11/1999 | Ninomiya | ............. | G06F 1/1632 |
| | | | | 713/340 |
| 6,952,783 B2 * | 10/2005 | Koertzen | .................. | G06F 1/26 |
| | | | | 713/300 |
| 2004/0125618 A1 * | 7/2004 | De Rooij | ............ | H02M 7/4807 |
| | | | | 363/17 |
| 2008/0143188 A1 * | 6/2008 | Adest | ...................... | H02M 7/42 |
| | | | | 307/82 |
| 2015/0180254 A1 * | 6/2015 | Zhao | ........................ | G06F 1/263 |
| | | | | 320/107 |
| 2019/0041934 A1 * | 2/2019 | Tan | ......................... | G06F 1/266 |

* cited by examiner

*Primary Examiner* — Elim Ortiz
(74) *Attorney, Agent, or Firm* — ANOVA LAW GROUP, PLLC

(57)        ABSTRACT

A power supply method includes determining that an electronic device is connected to an external power supply, configuring a first supply power of a first charging assembly, of the electronic device, that is configured to supply power to a first load assembly and a battery, and a second supply power of a second charging assembly, of the electronic device, that is configured to supply power to a second load assembly and the battery, in response to power being supplied to the first load assembly and the second load assembly, obtaining a first supply current of the first charging assembly to the battery and a second supply current of the second charging assembly to the battery, and in response to determining that the first supply current and the second supply current meet a condition, adjusting the first supply power and the second supply power.

16 Claims, 10 Drawing Sheets

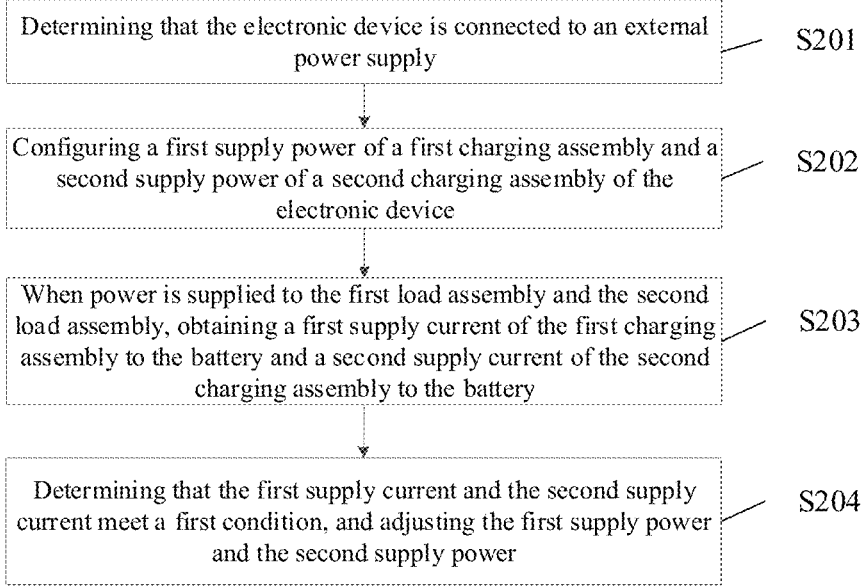

Determining that the electronic device is connected to an external power supply                    S201

Configuring a first supply power of a first charging assembly and a second supply power of a second charging assembly of the electronic device                    S202

When power is supplied to the first load assembly and the second load assembly, obtaining a first supply current of the first charging assembly to the battery and a second supply current of the second charging assembly to the battery                    S203

Determining that the first supply current and the second supply current meet a first condition, and adjusting the first supply power and the second supply power                    S204

FIG. 2

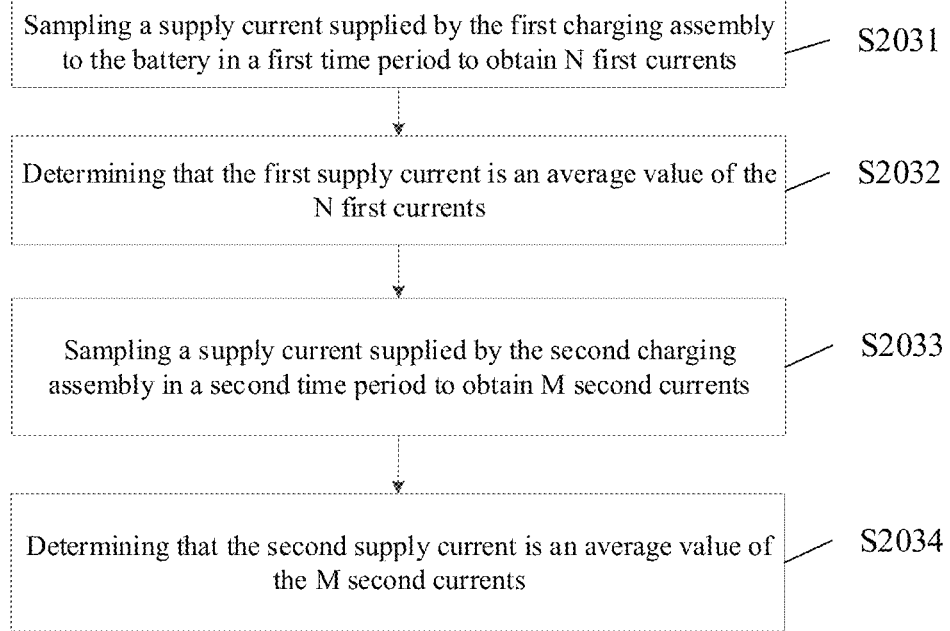

Sampling a supply current supplied by the first charging assembly to the battery in a first time period to obtain N first currents    S2031

Determining that the first supply current is an average value of the N first currents    S2032

Sampling a supply current supplied by the second charging assembly in a second time period to obtain M second currents    S2033

Determining that the second supply current is an average value of the M second currents    S2034

FIG. 3

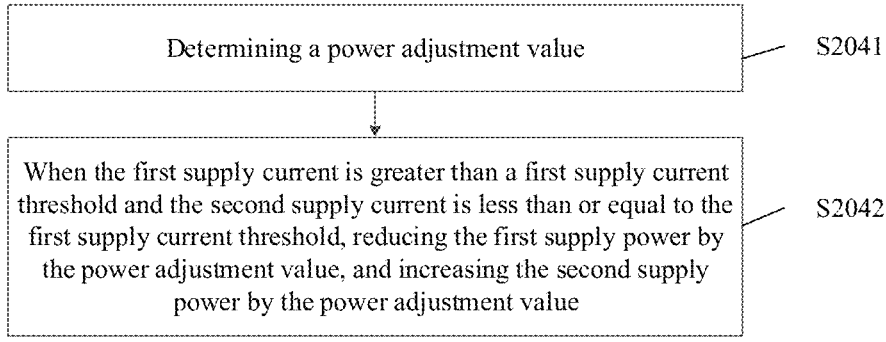

| Determining a power adjustment value | S2041 |

| When the first supply current is greater than a first supply current threshold and the second supply current is less than or equal to the first supply current threshold, reducing the first supply power by the power adjustment value, and increasing the second supply power by the power adjustment value | S2042 |

FIG. 4

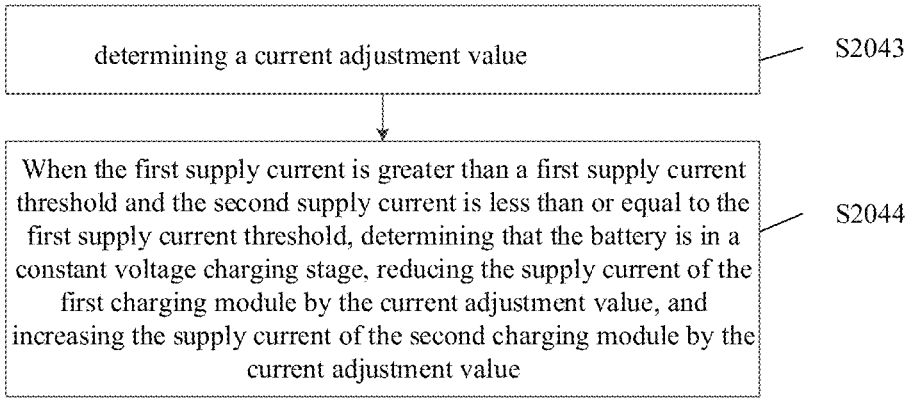

| determining a current adjustment value | S2043 |

| When the first supply current is greater than a first supply current threshold and the second supply current is less than or equal to the first supply current threshold, determining that the battery is in a constant voltage charging stage, reducing the supply current of the first charging module by the current adjustment value, and increasing the supply current of the second charging module by the current adjustment value | S2044 |

FIG. 5

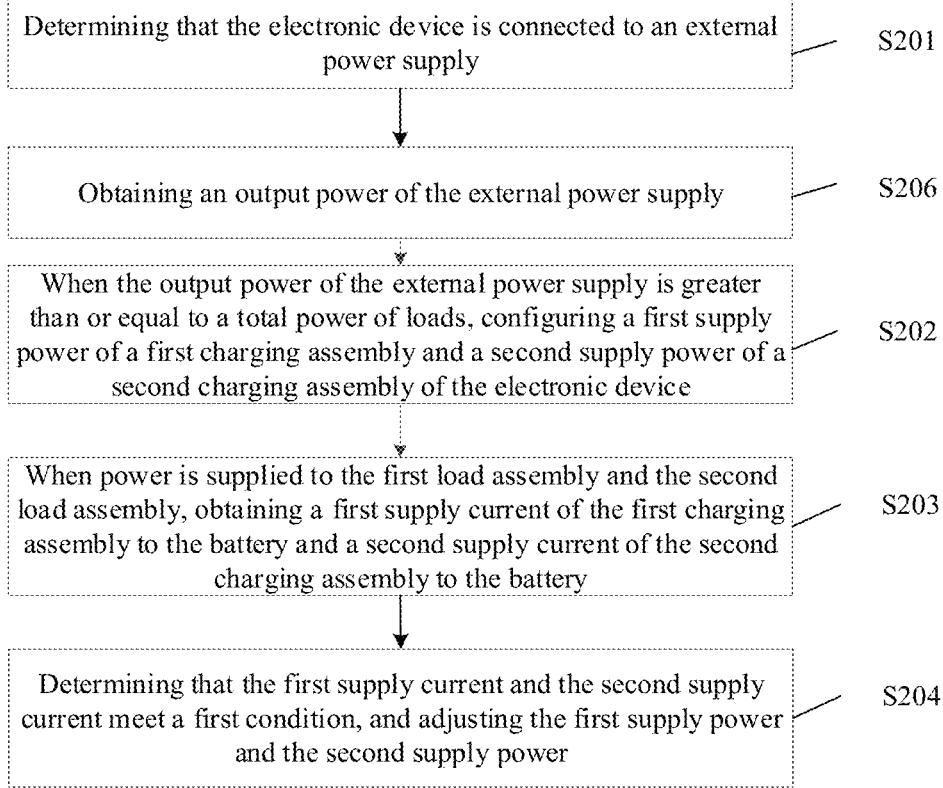

Determining that the electronic device is connected to an external power supply — S201

Obtaining an output power of the external power supply — S206

When the output power of the external power supply is greater than or equal to a total power of loads, configuring a first supply power of a first charging assembly and a second supply power of a second charging assembly of the electronic device — S202

When power is supplied to the first load assembly and the second load assembly, obtaining a first supply current of the first charging assembly to the battery and a second supply current of the second charging assembly to the battery — S203

Determining that the first supply current and the second supply current meet a first condition, and adjusting the first supply power and the second supply power — S204

POWER SUPPLY METHOD, DEVICE, AND EQUIPMENT THEREOF

CROSS-REFERENCE TO RELATED APPLICATION

This application claims priority to Chinese Patent Application No. 202311268054.1, filed on Sep. 27, 2023, the entire content of which is incorporated herein by reference.

TECHNICAL FIELD

The present disclosure generally relates to the field of power supply technologies and, more particularly, to a power supply method, a device and equipment thereof.

BACKGROUND

With the continuous development of various technologies, electronic devices are being integrated with more and more functions and consuming more and more power. For example, many tablet computers currently use large-size display components such as active-matrix organic light-emitting diodes (AMOLED) or liquid crystal displays (LCD). To improve the sound effect, 4 or 8 mini (SMART) power amplifiers (PA) are used as audio power amplifier devices. In this way, higher requirements are placed on the charging power of current charging integrated circuits.

At present, when a tablet computer is nearly fully charged, a switching power module is generally used to supply power to loads. Since the current capacity of a switching power module is about 10 amperes (A), it may not be able to meet the power need of high-power loads. At this time, the load will be charged through the battery, resulting in repeated charging of the battery and reducing the battery life.

SUMMARY

In accordance with the present disclosure, there is provided a power supply method including determining that an electronic device is connected to an external power supply, configuring a first supply power of a first charging assembly, of the electronic device, that is configured to supply power to a first load assembly and a battery, and a second supply power of a second charging assembly, of the electronic device, that is configured to supply power to a second load assembly and the battery, in response to power being supplied to the first load assembly and the second load assembly, obtaining a first supply current of the first charging assembly to the battery and a second supply current of the second charging assembly to the battery, and in response to determining that the first supply current and the second supply current meet a condition, adjusting the first supply power and the second supply power.

Also in accordance with the present disclosure, there is provided an electronic device including a processor and a memory storing a computer program that, when executed by the processor, causes the electronic device to determine that an electronic device is connected to an external power supply, configure a first supply power of a first charging assembly, of the electronic device, that is configured to supply power to a first load assembly and a battery, and a second supply power of a second charging assembly, of the electronic device, that is configured to supply power to a second load assembly and the battery, in response to power being supplied to the first load assembly and the second load assembly, obtain a first supply current of the first charging assembly to the battery and a second supply current of the second charging assembly to the battery, and in response to determining that the first supply current and the second supply current meet a condition, adjust the first supply power and the second supply power.

BRIEF DESCRIPTION OF THE DRAWINGS

FIG. 2 is a flowchart of a power supply method consistent with the present disclosure.

FIG. 3 is another flowchart of a power supply method consistent with the present disclosure.

FIG. 4 is another flowchart of a power supply method consistent with the present disclosure.

FIG. 5 is another flowchart of a power supply method consistent with the present disclosure.

FIG. 7 is another flowchart of a power supply method consistent with the present disclosure.

DETAILED DESCRIPTION OF THE EMBODIMENTS

Figure 1:
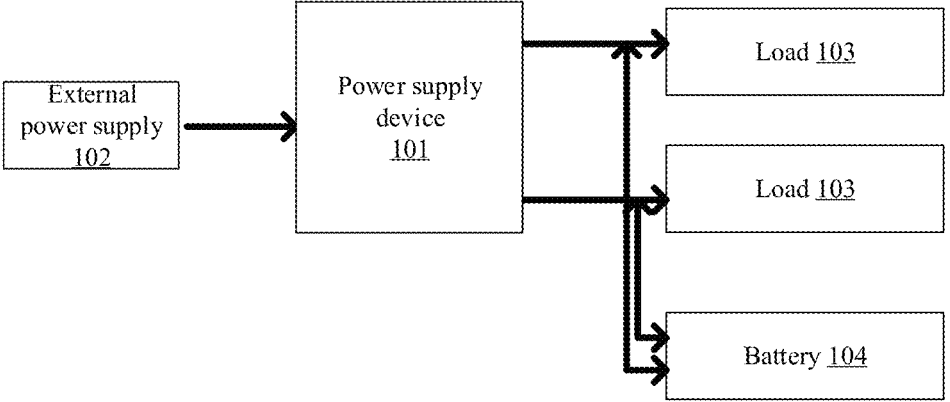
FIG. 1 is a schematic structural diagram of a power supply system consistent with the present disclosure.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure. Various modifications may be made to the embodiments of the present disclosure. Thus, the described embodiments should not be regarded as limiting, but are merely examples. Those skilled in the art will envision other modifications within the scope and spirit of the present disclosure.

Some embodiments of the present disclosure will be described below. The embodiments described in the present disclosure are a subset of all possible embodiments, but it is understood that "some embodiments" can be the same subset or different subsets of all possible embodiments, and can be combined with each other without conflict.

In the following description, the terms "first\second\third" involved are only used as examples to distinguish different objects, but do not represent a specific order for objects, and do not have a limitation on the order of precedence. It is understandable that "first\second\third" can be interchanged with a specific order or order of precedence where permitted, such that the embodiments of the present disclosure described here can be implemented in an order other than that illustrated or described here.

Unless otherwise defined, all technical and scientific terms used herein have the same meaning as those generally understood by those skilled in the art. The terms used herein are only for the purpose of describing the embodiments of the present disclosure and are not intended to limit the present disclosure.

The embodiments of the present disclosure provide a power supply method, device, equipment and storage medium. In practical applications, the power supply method may be implemented by a power supply device, and each functional entity in the power supply device may be implemented by cooperation of hardware resources of an electronic device, such as computing resources such as a processor, or communication resources for supporting various communication methods such as optical fiber and cellular.

The power supply method provided in the embodiments of the present disclosure may be applied to a power supply system. The power supply system may include: a power supply device, an external power supply, loads and a battery. The external power supply may be connected to the power supply device, and the power supply device may be connected to the loads and the battery.

The external power supply may be used to provide input power.

The power supply device may be used to: determine that the electronic device is connected to an external power supply; configure a first supply power of a first charging assembly and a second supply power of a second charging assembly of the electronic device, where the first charging assembly is able to supply power to a first load assembly and the battery, and the second charging assembly is able to supply power to a second load assembly and the battery; when the first load assembly and the second load assembly are powered, obtain a first supply current of the first charging assembly to the battery and a second supply current of the second charging assembly to the battery; and, determine that the first supply current and the second supply current meet the first condition, and adjust the first supply power and the second supply power.

For example, in one embodiment, the power supply system may be applied to the scenario shown in FIG. 1. The power supply system 10 may include: a power supply device 101, an external power supply 102, at least two loads 103, and a battery 104.

The external power supply 102 may be connected to the power supply device 101, and the power supply device 101 may be respectively connected to the at least two loads 103 and the battery 104.

The external power supply 102 may be used to provide input power to the power supply device 101.

The power supply device 101 may be used to: determine that the electronic device is connected to the external power supply; configure the first supply power of the first charging assembly of the electronic device and the second supply power of the second charging assembly, where the first charging assembly is able to power the first load assembly and the battery, and the second charging assembly is able to power the second load assembly and the battery; when the first load assembly and the second load assembly are powered, obtain the first supply current of the first charging assembly to the battery and the second supply current of the second charging assembly to the battery; and, determine that the first supply current and the second supply current meet the first condition, and adjust the first supply power and the second supply power.

It should be noted that the embodiment where at least two loads 103 are included is used as an example only to illustrate the present disclosure, and the specific number of loads 103 is not limited in the present disclosure. For example, the loads may be 3, 4, etc., and each load may include one or more components, that is, a load set.

The present disclosure does not limit the type of the loads, which may be configured according to actual needs. For example, a load may be a display, a power amplifier, a processor, etc.

In conjunction with the schematic diagram of the power supply system shown in FIG. 1, various embodiments of the power supply method, device, equipment, and storage medium provided by the present disclosure will be described.

The present disclosure provides a power supply method, which is applied to a power supply device. The power supply device may be deployed in an electronic device (such as the power supply device 101 in FIG. 1). Below, the power supply process provided by the present disclosure is described with the electronic device as the execution subject.

FIG. 2 illustrates a flowchart of a power supply method consistent with the present disclosure. As shown in FIG. 2, the method may include but is not limited to S201 to S204.

At S201, it is determined that the electronic device is connected to an external power supply.

The external power supply may be used to provide input power. The present disclosure does not limit the specific type of the external power supply, which may be configured according to actual needs. For example, the external power supply may be an adapter connected to a power supply, or a power interface.

In one embodiment, S201 may include that the electronic device detects the current or voltage of the input port to determine whether the electronic device is connected to the external power supply. After detecting a preset current value or a preset voltage value, it may be determined that the electronic device is connected to the external power supply.

At S202, the first supply power of the first charging assembly of the electronic device and the second supply power of the second charging assembly are configured.

The first charging assembly may be able to supply power to the first load assembly and the battery; and, the second charging assembly may be able to supply power to the second load assembly and the battery.

The electronic device may at least include the first charging assembly and the second charging assembly. The first charging assembly and the second charging assembly may be connected in parallel to the external power supply.

In some embodiments, the electronic device may also include a third charging assembly, through which a third load assembly and the battery are powered.

One charging assembly may be used to charge the load. The present disclosure does not limit the specific type of the charging assembly, which may be configured according to actual needs.

In one embodiment, the charging assembly may be a switching power supply charging assembly. For example, the charging assembly may be a BUCK charging assembly.

The powered loads in the electronic device may be divided into the first load assembly and the second load assembly. The first charging assembly may power the first load assembly and the battery. The second charging assembly may power the second load assembly and the battery. The present disclosure does not limit the specific division manner of the first load assembly and the second load assembly, which may be configured based on actual conditions.

In one embodiment, the first load assembly may include a load device for realizing basic functions, and the second load assembly may include a load device with power larger than or equal to a power threshold. Therefore, since the first load assembly includes the load device for realizing basic functions, the first charging assembly that supplies power to the first load assembly may also be called a main charging assembly, and the corresponding second charging assembly may be called an auxiliary charging assembly or a sub-charging assembly.

In one embodiment, S202 may include: the electronic device configures the first supply power and the second supply power based on the initial power ratio and the output power of the external power supply.

In one embodiment, the initial power ratio may be a fixed value, for example, 1:1; or 2:1, etc.

In some other embodiments, the initial power ratio may be determined based on the ratio between the power of the first load assembly and the power of the second load assembly.

The power of the first load assembly and the power of the second load assembly here may be the rated power, or the average value of the power over a time period, etc.

At S203, when the first load assembly and the second load assembly are powered, the electronic device obtains the first supply current of the first charging assembly to the battery and the second supply current of the second charging assembly to the battery.

The electronic device may first detect whether the first load assembly and the second load assembly are in a powered state. When the first load assembly and the second load assembly are in a powered state, the electronic device may further detect the current supplied by the first charging assembly to the battery through a current sensor as the first supply current; and detect the current supplied by the second charging assembly to the battery through a current sensor as the second supply current.

The powered state may be a constant voltage charging state or a constant current charging state.

At S204, the electronic device determines that the first supply current and the second supply current meet the first condition, and adjusts the first supply power and the second supply power.

The first condition may be used to determine whether the first power and the second power need to be adjusted.

In one embodiment, the first condition may include: the first supply current is larger than a first supply current threshold, and the second supply current is less than the first supply current threshold.

When the second supply current is less than the first supply current threshold, it may mean that the current flowing from the second charging assembly to the battery is negative, that is, the battery is discharging. At this time, it may be needed to re-adjust the first supply power and the second supply power to try to keep the first supply current and the second supply current positive, to avoid battery discharge and improve battery life.

The specific method for adjusting the first supply power and the second supply power is not limited here, and may be configured based on actual needs. For example, the power ratio may be adjusted directly, or the output current of the first charging assembly and the second charging assembly may be adjusted, to achieve the adjustment of the first supply power and the second supply power.

In the present disclosure, the power supply method may include: determining that the electronic device is connected to the external power supply; configuring the first supply power of the first charging assembly and the second supply power of the second charging assembly of the electronic device, where the first charging assembly is able to supply power to the first load assembly and the battery; and the second charging assembly is able to supply power to the second load assembly and the battery; when the first load assembly and the second load assembly are supplied with power, obtaining the first supply current of the first charging assembly to the battery and the second supply current of the second charging assembly to the battery; determining that the first supply current and the second supply current meet the first condition, and adjusting the first supply power and the second supply power.

It can be seen that, in the present disclosure, on the one hand, the loads and the battery may be charged by two charging assemblies, which has the characteristics of load balancing; on the other hand, the two charging assemblies may increase the power supply capacity, improve the charging efficiency, and have the characteristics of high charging efficiency. On the other hand, the loads may be charged by two charging assemblies, which improves the power supply capacity of the load, reduces the probability of charging the loads by the rechargeable battery, reduces the probability of repeated charging, and improves the service life of the battery. Further, the first supply power and the second power may be adjusted to further balance the power supply capacity, and may be adjusted according to actual needs, thereby improving the adaptability of the power supply.

The process of the electronic device obtaining the first supply current of the first charging assembly to the battery and the second supply current of the second charging assembly to the battery in S203 will be described below.

The process in S203 may include but is not limited to the following method 1 or method 2.

Method 1, the supply current of the first charging assembly to the battery and the supply current of the second charging assembly to the battery within a time period are collected to obtain N first supply currents and M second supply currents.

Method 2, the supply current of the first charging assembly to the battery and the supply current of the second charging assembly to the battery at the current moment are collected to obtain the first supply current and the second supply current.

In method 1, collecting the supply current of the first charging assembly to the battery and the supply current of the second charging assembly to the battery within a time period to obtain N first supply currents and M second supply currents may include, but is not limited to, S2031 to S2034.

At S2031, the electronic device samples the supply current provided by the first charging assembly to the battery in the first time period to obtain N first supply currents.

S2031 may include: the electronic device samples the supply current provided by the first charging assembly to the battery in the first time period based on the first sampling frequency through a current detection sensor to obtain N first supply currents.

The present disclosure does not limit the specific duration of the first time period and the sampling frequency, which may be configured according to actual needs. For example, the first time period may be 10 seconds, and the sampling frequency may be once per second.

At S2032, the electronic device determines that the first supply current is the average value of the N first supply currents.

At S2033, the electronic device samples the supply current of the second charging assembly in the second time period to obtain M second supply currents.

For details of S2033, references may be made to the description of sampling the supply current provided by the first charging assembly to the battery in the first time period to obtain N first supply currents at S2031.

M and N may be positive integers, and may be same as or different from each other.

The second time period may be the same as or different from the first time period, and the second sampling frequency in the second time period may be the same as or different from the first sampling frequency.

At S2034, the electronic device determines that the second supply current is the average value of the M second currents.

The process of collecting the supply current of the first charging assembly to the battery and the second charging assembly to the battery at the current moment in method 2 to obtain the first supply current and the second supply current is described below.

In method 2, the electronic device may directly collect the supply currents of the first charging assembly to the battery and the second charging assembly to the battery in the current state as the first supply current and the second supply current, respectively.

It can be seen that compared with method 2, method 1 may have the characteristics of high accuracy. Compared with method 1, method 2 may have the characteristics of simple implementation.

The first condition will be described below.

In one embodiment, the first condition may include: the first supply current is larger than the first supply current threshold; and the second supply current is less than or equal to the first supply current threshold.

In another embodiment, the first condition may include: the N first supply currents are all larger than the first supply current threshold, and the M second supply currents are all less than the first supply current threshold.

Below, the process of the electronic device adjusting the first supply power and the second supply power in S204 is described.

In one embodiment, as shown in FIG. 4, S204 may include but is not limited to the following S2041 and S2042.

At S2041, the electronic device determines a power adjustment value.

In one embodiment, the power adjustment value may be an empirical value or a preset fixed value.

In another embodiment, the power adjustment value may be a power value that is able to be adjusted based on a formula calculation.

At S2042, when the first supply current is larger than the first supply current threshold and the second supply current is less than or equal to the first supply current threshold, the electronic device reduces the first supply power by the power adjustment value, and increases the second supply power by the power adjustment value.

In one embodiment, the first supply current threshold may be zero. In another embodiment, the first supply current threshold may be −200 mA.

In this way, the second supply power may be increased, which may improve the power supply capacity of the second charging assembly, such that the current flowing from the second charging assembly to the battery is positive, preventing the battery from outputting current in reverse and causing repeated charging.

In another embodiment, as shown in FIG. 5, S204 may include but is not limited to the following S2043 and S2044.

At S2043, the electronic device determines the current adjustment value.

In one embodiment, the current adjustment value may be an empirical value or a preset fixed value.

In another embodiment, the current adjustment value may be a current value that may be adjusted based on a formula calculation. For example, the current adjustment value may be a current value determined based on the following formula:

$$\text{Current adjustment value} = \qquad (1)$$

$$(V_{BAT} \times 200 \text{ mA})/(\text{efficiency} \times \text{input voltage})$$

In Formula 1, VBAT represents the voltage of the battery; efficiency represents the charging efficiency.

At S2044, when the first supply current is larger than the first supply current threshold and the second supply current is less than or equal to the first supply current threshold, the electronic device determines that the battery is in the constant voltage charging stage, reduces the supply current of the first charging assembly by the current adjustment value, and increases the supply current of the second charging assembly by the current adjustment value.

In the constant voltage charging stage, since the voltage is constant, the power adjustment may be achieved directly by adjusting the current.

Figure 6:
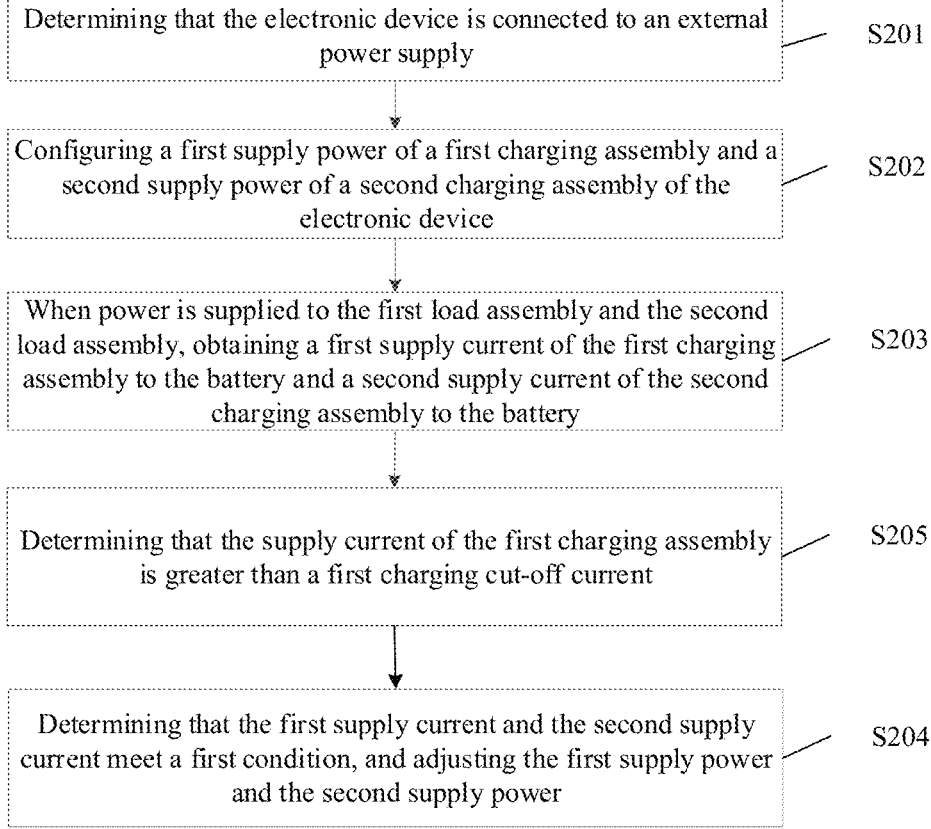
FIG. 6 is another flowchart of a power supply method consistent with the present disclosure.

In one embodiment, before adjusting the first supply power and the second supply power in S204, as shown in FIG. 6, the power supply method may further include:

S205: determining that the supply current of the first charging assembly is larger than the first charging cut-off current.

The first charging cut-off current may be the charging cut-off current of the first charging assembly, where the first charging assembly stops supplying power when the supply current of the first charging assembly is less than the first charging cut-off current.

Therefore, correspondingly, when the supply current of the first charging assembly is larger than the first charging cut-off current, the first supply power may be adjusted in S204.

The adjusted supply current of the first charging assembly may be larger than the first charging cut-off current.

The second charging cut-off current may be the charging cut-off current of the second charging assembly, where when the supply current of the second charging assembly is less than the second charging cut-off current, the second charging assembly stops supplying power.

The second charging cut-off current may be the same or different from the first charging cut-off current.

Therefore, correspondingly, when the supply current of the second charging assembly is larger than the second charging cut-off current, the second supply power in S204 may be adjusted.

The adjusted supply current of the second charging assembly may be larger than the second charging cut-off current.

In one embodiment, as shown in FIG. 7, the power supply method may further include:

S206: the electronic device obtains the output power of the external power supply.

The electronic device may detect the output power of the external power supply through a power detection device.

Correspondingly, when the output power of the external power supply is larger than or equal to the total load power, the first supply power of the first charging assembly of the electronic device and the second supply power of the second charging assembly may be configured in S202, such that the configured first supply power and the second supply power have a first initial power ratio.

The total load power may be the sum of the powers of all load devices. For example, the total load power may be the sum of the powers of the first load assembly and the second load assembly.

Figure 8:
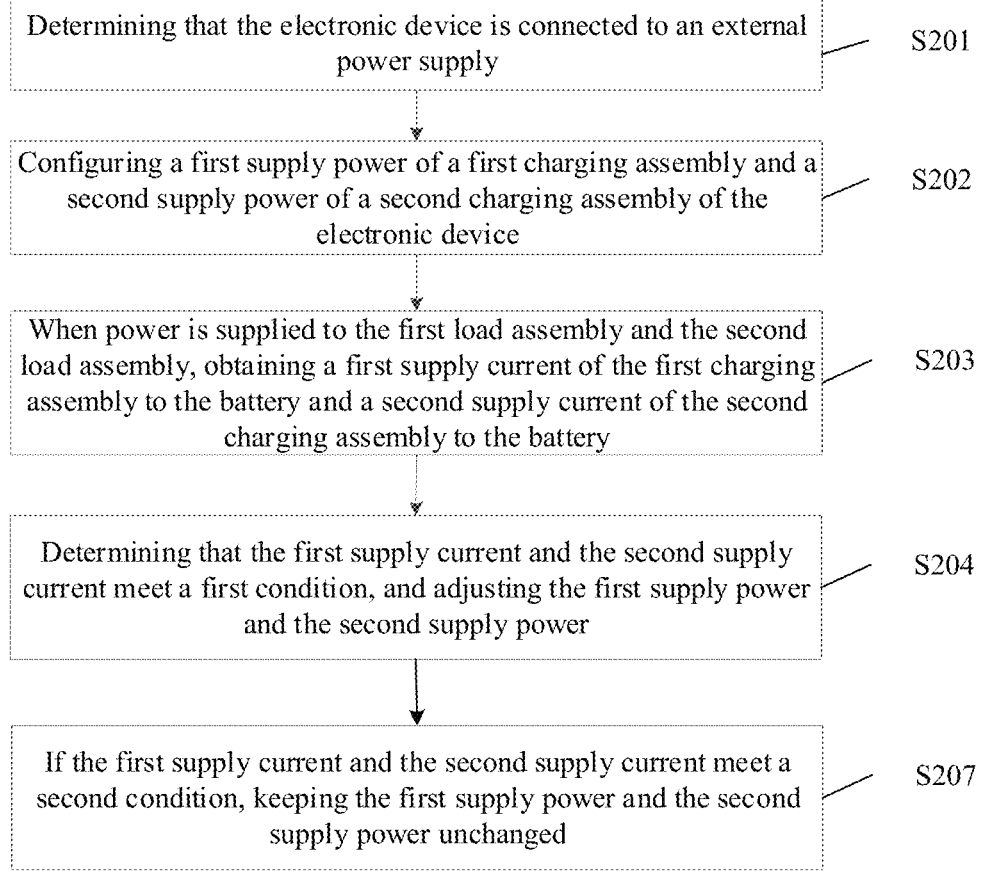
FIG. 8 is another flowchart of a power supply method consistent with the present disclosure.

In one embodiment, as shown in FIG. 8, the power supply method may further include:

S207: when the first supply current and the second supply current meet the second condition, the electronic device maintains the first supply power and the second supply power unchanged.

The second condition may include: the first supply current and the second supply current are both larger than the first supply current threshold; or, the first supply current and the second supply current are both less than or equal to the first supply current threshold.

When the first supply current and the second supply current are both larger than the first supply current threshold, the power supply capacity of the first charging assembly and the second charging assembly may be both larger than the power of the loads, and there may be no situation of power supply in the battery direction, such that no adjustment is required.

When the first supply current and the second supply current are both less than or equal to the first supply current threshold, the power supply capacity of the first charging assembly and the second charging assembly may be both less than the power of the loads. Therefore, no matter how to adjust, there may be a phenomenon of reverse power supply of the battery, and the adjustment may be meaningless. Correspondingly, the first supply power and the second supply power may be maintained unchanged.

An example to illustrate the power supply method provided by the embodiments of the present disclosure will be described below.

In the related technologies, a mobile tablet adopts a large-size display component such as a large-size AMOLED or LCD, and at the same time, 4 or 8 mini power amplifiers (SMART PA) are used as audio power amplifier devices to improve the sound effect, which puts high requirements on the charging path (POWER PATH) and charging power of the current charging integrated circuit (IC).

At present, the high-power charging solution of the tablet is a charge pump solution, which belongs to a constant output current charging solution. Unlike the switch BUCK (equivalent to the above-mentioned charging assembly) charging solution, the constant output current charging solution does not have a solution to dynamically adjust the output current through the hardware duty cycle (DUTY CYCLE). Therefore, when the battery is fully charged, the system provides the charger power to the system through the BUCK switch charging IC.

The BUCK charging IC generally has a continuous overcurrent capability of 10 A, and the charging power is only 12 W~15 W. In this way, the following problems will occur when the system is fully charged.

First, because of the continuous overcurrent capability of 10 A, the instantaneous high-power draw of 8 SMART PAs is generally around 14~15 A, which exceeds the continuous overcurrent capability of the BUCK IC, such that the high-power audio PA is directly connected to the battery, causing the battery to be quickly and repeatedly recharged and affecting battery performance.

Second, the power consumption of the AMOLED plus the system power consumption is larger than the 12~15 W BUCK system output capacity, and the missing power also needs to be supplemented from the battery, causing the battery to be quickly and repeatedly recharged, and affecting battery performance.

The present disclosure provides a power supply system, which may also be called a distributed charging architecture (equivalent to the above-mentioned charging circuit), Separate charging systems for the system's heavy power consumption components and the system may be designed, and the charging power may be dynamically allocated, to meet the system power consumption requirements.

Figure 9:
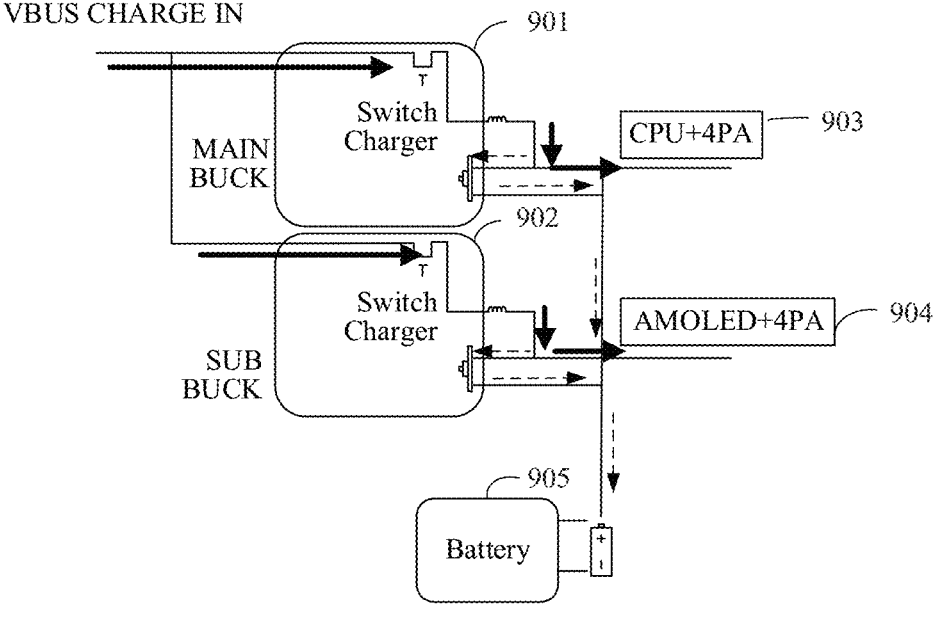
FIG. 9 is a schematic structural diagram of another power supply system consistent with the present disclosure.

The specific structure may refer to the content shown in FIG. 9. In one embodiment, the system may include: a main switch power supply assembly 901 (MAIN BUCK) 901, an auxiliary switch power supply assembly (SUB BUCK) 902, a first load assembly (CPU+4PA) 903, a second load assembly (AMOLED+4PA) 904, and a battery (BAT) 905.

The charging line (VBUS CHARGE IN) of the charger may be connected in parallel to MAIN BUCK 901 and SUB BUCK 902 respectively. The first output port of MAIN BUCK 901 may supply power to CPU+4PA 903 (refer to the thick arrow), the second output port of MAIN BUCK 901 may supply power to the battery (refer to the dotted line head), the first output port of SUB BUCK 902 may supply power to AMOLED+4PA 904 (refer to the thick arrow), and the second output port of SUB BUCK 902 may supply power to the battery (refer to the dotted line head).

The control logic of the charging process is described below.

This embodiment performs dynamic power allocation by limiting the charging current at the input end.

This embodiment may be applied to a high-power charger with a charging power larger than or equal to a preset power value, such as 7.5 W or more, and may perform the following power allocation.

Step 1, allocating the initial power of the main charging assembly Main and the slave charging assembly SUB according to the charging table.

Step 2: sampling 10 times with a frequency of once per second. According to the battery charging current detection information MAIN_IBAT_ADC of the main charging assembly and the battery charging current detection information SUB_IBAT_ADC of the slave charging assembly, there may be a negative current (above-200 mA) for 10 seconds, that is, the system draws power from the battery.

Step 3: determining whether only one of the BUCK ICs has negative electricity.

Step 4: before performing dynamic power allocation, it is needed to determine whether the IBUS current of the charging IC whose IBAT current is not negative meets the requirements, that is, if VBUS-5V, whether the current IBUS current limit is larger than the charging cut-off current +300 mA. If VBUS=9V, whether the IBUS current limit×2 is larger than the charging cut-off current +200 mA.

If the requirement is met at step 4, step 5 may be executed. If the requirement is not met at step 4, step 6 may be executed.

Step 5: Perform dynamic adjustment.

The input charging current of the BUCK IC with negative charge may be increased (VBUS is increased by 200 mA when it is between 5V (including V) and 9V (excluding) and 90 mA when it is 9V and above), and the input current of the other BUCK charging IC may be reduced (VBUS is reduced by 200 mA when it is between 5V (including V) and 9V (excluding) and 200 mA when it is 9V and above), and then the determination process may be repeated.

Step 6: when both BUCK ICs have negative charging, the current ratio is maintained unchanged.

Adjusted current=(VBAT×200 mA)/(efficiency×input voltage), and the 5V and 9V above correspond to the expected increase after calculation.

It should be noted that in this scenario, when the battery is fully charged and the screen is on, the charging voltage may be increased according to the protocol, such as 9V. When the screen is off, the VBUS voltage may be reduced to 5V.

Figure 10:
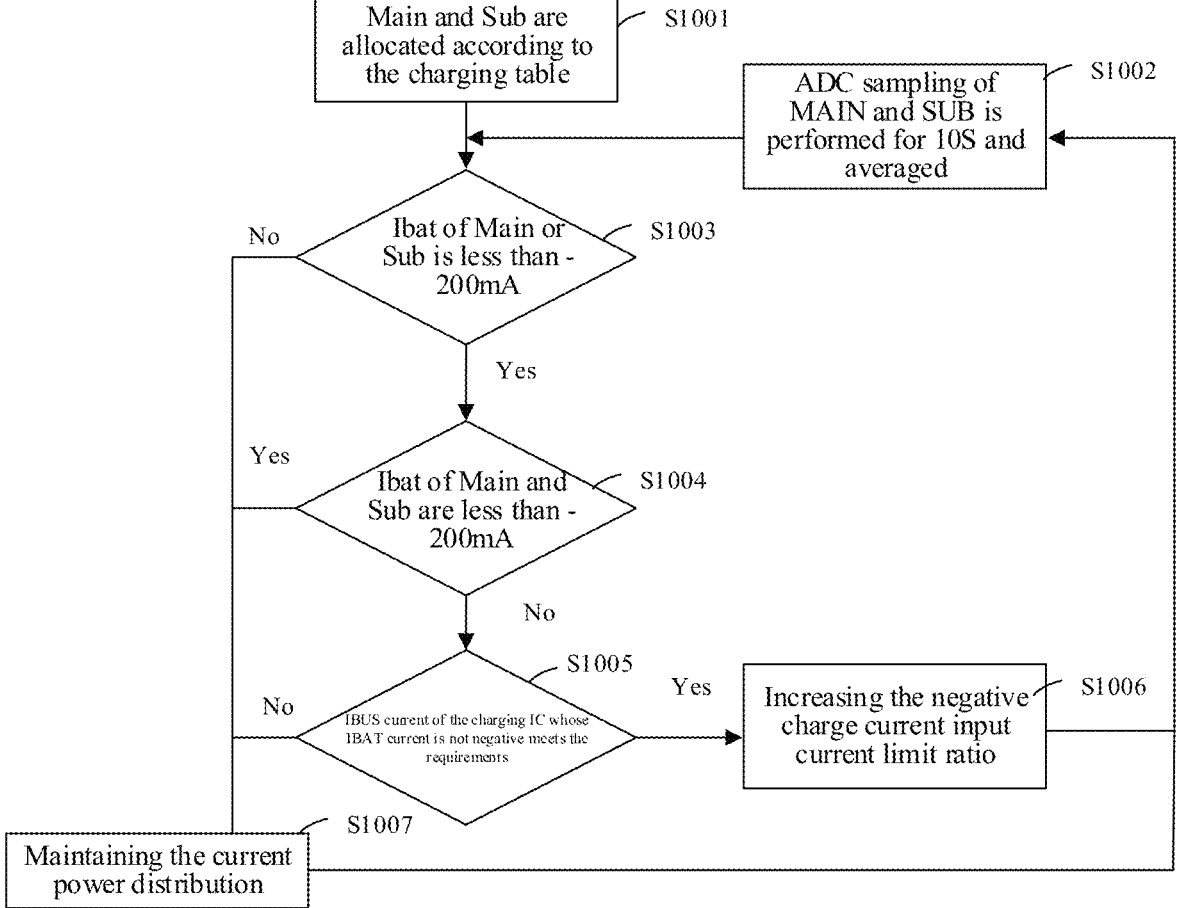
FIG. 10 is a flowchart of a power supply process consistent with the present disclosure.

As shown in FIG. 10, the process may include but is not limited to the following S1001 to S1007.

S1001, Main and Sub are allocated according to the charging table.

S1002, ADC sampling of MAIN and SUB is performed for 10S and averaged.

S1003, whether the Ibat of Main or Sub is less than −200 mA is determined. If so, execute the following S1004; if not, execute the following S1007.

S1004, whether the Ibat of Main and Sub are less than −200 mA is determined.

If so, execute the following S1007; if not, execute the following S1005.

S1005, whether the IBUS current of the charging IC whose IBAT current is not negative meets the requirements is determined.

That is, if VBUS=5V, whether the IBUS current limit is larger than the charge cutoff current +300 mA is determined If VBUS=9V, whether the IBUS current limit×2 is larger than the charge cutoff current +200 mA is determined.

If so, execute S1006 below; if not, execute S1007 below.

S1006, increasing the negative charge current input current limit ratio.

S1007, maintaining the current power distribution.

The present disclosure also provides a power supply device, to implement the power supply method provided by various embodiments of the present disclosure.

Figure 11:
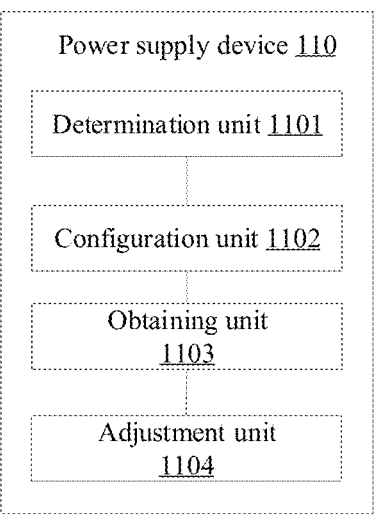
FIG. 11 is a schematic structural diagram of a power supply device consistent with the present disclosure.

As shown in FIG. 11, in one embodiment, the power supply device 110 may include: a determination unit 1101 (for the sake of distinction, it may also be referred to as a first determination unit), a configuration unit 1102, an obtaining unit 1103, and an adjustment unit 1104.

The determination unit 1101 may be used to determine that the electronic device is connected to the external power supply.

The configuration unit 1102 may be used to configure the first supply power of the first charging assembly and the second supply power of the second charging assembly of the electronic device, where the first charging assembly is able to supply power to the first load assembly and the battery, and the second charging assembly is able to supply power to the second load assembly and the battery.

The obtaining unit 1103 may be used to obtain the first supply current of the first charging assembly to the battery and the second supply current of the second charging assembly to the battery when the first load assembly and the second load assembly are powered.

The adjustment unit 1104 may be used to determine that the first supply current and the second supply current meet the first condition, and adjust the first supply power and the second supply power.

In some embodiments, the obtaining unit 1103 may be further used to: sample the supply current provided by the first charging assembly to the battery in the first time period to obtain N first currents; determine that the first supply current is the average value of the N first currents; sample the supply current of the second charging assembly in the second time period to obtain M second currents; and determine that the second supply current is the average value of the M second currents.

In some embodiments, the first condition may include: the first supply current is larger than the first supply current threshold; and the second supply current is less than or equal to the first supply current threshold.

In some embodiments, the adjusting unit 1104 may be further used to: determine a power adjustment value; and, when the first supply current is larger than the first supply current threshold and the second supply current is less than or equal to the first supply current threshold, reduce the first supply power by the power adjustment value, and increase the second supply power by the power adjustment value.

In some embodiments, the adjusting unit 1104 may be further used to: determine a current adjustment value; and, when the first supply current is larger than the first supply current threshold and the second supply current is less than or equal to the first supply current threshold, determine that the battery is in the constant voltage charging stage, reduce the supply current of the first charging assembly by the current adjustment value, and increase the supply current of the second charging assembly by the current adjustment value.

In some embodiments, the power supply device 110 may further include a second determination unit. The second determination unit may be used to: before performing the adjustment of the first supply power and the second supply power, determine that the supply current of the first charging assembly is larger than the first charging cut-off current. Correspondingly, if the supply current of the first charging assembly is larger than the first charging cut-off current, the adjustment unit 1104 may perform the adjustment of the first supply power; where the adjusted supply current of the first charging assembly is larger than the first charging cut-off current.

In some embodiments, the power supply device 110 may further include a second obtaining unit. The second obtaining unit may be used to obtain the output power of the external power supply.

Correspondingly, if the output power of the external power supply is larger than or equal to the total power of the load, the configuration unit 1102 may perform the configuration of the first supply power of the first charging assembly and the second supply power of the second charging assembly of the electronic device, such that the configured first supply power and the second supply power have a first initial power ratio.

In some embodiments, the adjustment unit 1104 may be further used to: when the first supply current and the second supply current meet a second condition, keep the first supply power and the second supply power unchanged. The second condition may include: both the first supply current and the second supply current are larger than the first supply current threshold; or both the first supply current and the second supply current are less than or equal to the first supply current threshold.

Various units/components in the power supply device provided by various embodiments of the present disclosure may be implemented as a processor of an electronic device or a logic circuit. The processor may be a central processing unit (CPU), a micro processor unit (MPU), a digital signal processor (DSP), or a field programmable gate array (FPGA).

The description of the above device embodiments is similar to the description of the above method embodiments, and have similar beneficial effects as the method embodiments. For technical details not disclosed in the device embodiments of the present disclosure please refer to the description of the method embodiments of the present disclosure.

In the present disclosure, the power supply method may be implemented in the form of a software function module and sold or used as an independent product. It may also be stored in a computer-readable storage medium. Based on this understanding, the technical solution of the embodiments of the present disclosure may be essentially or partly reflected in the form of a software product. The computer software product may be stored in a storage medium, including a number of instructions to enable a computer device (which may be a personal computer, server, or network device, etc.) to execute all or part of the methods described in various embodiments of the present disclosure. The aforementioned storage medium may include: various media that can store program codes, such as a flash disk, a mobile hard disk, a read-only memory (ROM), a magnetic disk or an optical disk. In this way, the embodiments of the present disclosure are not limited to any specific combination of hardware and software.

The present disclosure also provides an electronic device, to implement the power supply method provided by various embodiments of the present disclosure. The electronic device may include a memory and a processor. The memory may be configured to store a computer program that is able to be executed by the processor. The processor may execute the computer program such that the electronic device implements the power supply method provided by various embodiments of the present disclosure.

The present disclosure also provides a storage medium, that is, a computer-readable storage medium. The storage medium may be configured to store a computer program. When the computer program is executed by a processor, a device where the processor is located may implement the power supply method provided by various embodiments of the present disclosure.

The description of the above electronic device and storage medium embodiments is similar to the description of the above method embodiments and has similar beneficial effects as the method embodiments. For technical details not disclosed, please refer to the description of the method embodiments of the present disclosure.

In the present disclosure, "one embodiment" or "an embodiment" means that specific features, structures or characteristics related to the embodiment are included in at least one embodiment of the present disclosure. Therefore, "in one embodiment" or "in some embodiments" appearing throughout the specification may not necessarily refer to the same embodiment. In addition, these specific features, structures or characteristics may be combined in one or more embodiments in any suitable manner. It should be understood that in the various embodiments of the present disclosure, the size of the sequence number of the above-mentioned processes does not mean the order of execution. The execution order of each process should be determined by its function and internal logic, and should not constitute any limitation on the implementation process of the embodiments of the present disclosure. The above-mentioned sequence numbers of the embodiments of the present disclosure are for description only and do not represent the advantages and disadvantages of the embodiments.

In the present disclosure, the terms "comprises," "includes," or any other variation thereof are intended to cover a non-exclusive inclusion, such that an article or device including a list of elements includes not only those elements, but also other elements not expressly listed. Or it also includes elements inherent to the article or equipment. Without further limitation, an element associated with the statement "comprises a . . . " does not exclude the presence of other identical elements in an article or device that includes the above-mentioned element.

The disclosed equipment and methods may be implemented in other ways. The device embodiments described above are only illustrative. For example, the division of the units is only a logical function division. In actual implementation, there may be other division methods, such as: a plurality of units or components may be combined, or may be integrated into another system, or some features may be ignored, or not implemented. In addition, the coupling, direct coupling, or communication connection between the components shown or discussed may be through some interfaces, and the indirect coupling or communication connection of the devices or units may be electrical, mechanical, or other forms.

The units described above as separate components may or may not be physically separated. The components shown as units may or may not be physical units. They may be located in one place or distributed to a plurality of network units. Some or all of the units may be selected according to actual needs to achieve the purpose of the solution of the present disclosure.

In addition, all functional units in the embodiments of the present disclosure may be integrated into one processing unit, or each unit may be separately used as a unit, or two or more units may be integrated into one unit. The above-mentioned integration units may be implemented in the form of hardware or in the form of hardware plus software functional units.

All or part of the steps to implement the above method embodiments may be completed by hardware related to program instructions. The aforementioned program may be stored in a computer-readable storage medium. When the program is executed, the steps including the above method embodiments may be executed. The aforementioned storage media may include: removable storage devices, read only memories (ROMs), magnetic disks, optical disks or other media that may store program codes.

When the integrated units mentioned above in the present disclosure are implemented in the form of software function modules and sold or used as independent products, they may also be stored in a computer-readable storage medium. Based on this understanding, the technical solutions of the embodiments of the present disclosure in essence or those that contribute to the existing technology may be embodied in the form of software products. The computer software products may be stored in a storage medium and include a number of instructions for instructing the product to perform all or part of the methods described in various embodiments of the present disclosure. The aforementioned storage media may include: random access memory (RAM), read-only memory (ROM), electrical-programmable ROM, electrically erasable programmable ROM, register, hard disk, mobile storage device, CD-ROM, magnetic disks, optical disks, or other media that may store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A power supply method comprising:

determining that an electronic device is connected to an external power supply;

configuring a first supply power of a first charging assembly of the electronic device and a second supply power of a second charging assembly of the electronic device, the first charging assembly being configured to supply power to a first load assembly and a battery, and the second charging assembly being configured to supply power to a second load assembly and the battery;

in response to power being supplied to the first load assembly and the second load assembly, obtaining a first supply current of the first charging assembly to the battery and a second supply current of the second charging assembly to the battery; and in response to determining that the first supply current and the second supply current meet a condition, adjusting the first supply power and the second supply power.

2. The method according to claim 1, wherein obtaining the first supply current and the second supply current includes:

sampling a supply current supplied by the first charging assembly to the battery in a first time period to obtain a plurality of first currents;

determining an average of the plurality of first currents as the first supply current;

sampling a supply current supplied by the second charging assembly to the battery in a second time period to obtain a plurality of second currents; and determining an average of the plurality of second currents as the second supply current.

3. The method according to claim 2, wherein the condition includes:

the first supply current is larger than a supply current threshold; and the second supply current is less than or equal to the supply current threshold.

4. The method according to claim 1, wherein adjusting the first supply power and the second supply power includes:

determining a power adjustment value; and in response to the first supply current being larger than a supply current threshold and the second supply current being less than or equal to the supply current threshold, reducing the first supply power by the power adjustment value, and increasing the second supply power by the power adjustment value.

5. The method according to claim 1, wherein adjusting the first supply power and the second supply power includes:

determining a current adjustment value; and in response to the first supply current being larger than a supply current threshold and the second supply current being less than or equal to the supply current threshold, determining that the battery is in a constant voltage charging stage, reducing a supply current of the first charging assembly by the current adjustment value, and increasing a supply current of the second charging assembly by the current adjustment value.

6. The method according to claim 1, further comprising, before adjusting the first supply power and the second supply power:

determining whether a supply current of the first charging assembly is larger than a charging cut-off current;

wherein adjusting the first supply power includes in response to the supply current of the first charging assembly being larger than the charging cut-off current, adjusting the first supply power to be larger than the charging cut-off current.

7. The method according to claim 1, further comprising:

obtaining an output power of the external power supply;

wherein configuring the first supply power and the second supply power includes in response to the output power of the external power supply being larger than or equal to a total power of loads, configuring the first supply power and the second supply power such that a ratio of the first supply power to the second supply power equals an initial power ratio.

8. The method according to claim 1, wherein the condition is a first condition;

the method further comprising:

in response to the first supply current and the second supply current meeting a second condition, keeping the first supply power and the second supply power unchanged;

wherein the second condition includes:

the first supply current and the second supply current are both larger than a supply current threshold; or the first supply current and the second supply current are both less than or equal to the supply current threshold.

9. An electronic device comprising:

a processor; and a memory storing a computer program that, when executed by the processor, causes the electronic device to:

determine that an electronic device is connected to an external power supply;

configure a first supply power of a first charging assembly of the electronic device and a second supply power of a second charging assembly of the electronic device, the first charging assembly being configured to supply power to a first load assembly and a battery, and the second charging assembly being configured to supply power to a second load assembly and the battery;

in response to power being supplied to the first load assembly and the second load assembly, obtain a first supply current of the first charging assembly to the battery and a second supply current of the second charging assembly to the battery; and in response to determining that the first supply current and the second supply current meet a condition, adjust the first supply power and the second supply power.

10. The electronic device according to claim 9, wherein the computer program, when executed by the processor, further cause the electronic device to, when obtaining the first supply current and the second supply current:

sample a supply current supplied by the first charging assembly to the battery in a first time period to obtain a plurality of first currents;

determine an average of the plurality of first currents as the first supply current;

sample a supply current supplied by the second charging assembly to the battery in a second time period to obtain a plurality of second currents; and determine an average of the plurality of second currents as the second supply current.

11. The electronic device according to claim 10, wherein the condition includes:

the first supply current is larger than a supply current threshold; and the second supply current is less than or equal to the supply current threshold.

12. The electronic device according to claim 9, wherein the computer program, when executed by the processor, further cause the electronic device to, when adjusting the first supply power and the second supply power:

determine a power adjustment value; and in response to the first supply current being larger than a supply current threshold and the second supply current being less than or equal to the supply current threshold, reduce the first supply power by the power adjustment value, and increase the second supply power by the power adjustment value.

13. The method according to claim 1, wherein adjusting the first supply power and the second supply power includes:

determining a current adjustment value; and in response to the first supply current being larger than a supply current threshold and the second supply current being less than or equal to the supply current threshold, determining that the battery is in a constant voltage charging stage, reducing a supply current of the first charging assembly by the current adjustment value, and increasing a supply current of the second charging assembly by the current adjustment value.

14. The electronic device according to claim 9, wherein the computer program, when executed by the processor, further cause the electronic device to:

before adjusting the first supply power and the second supply power, determine whether a supply current of the first charging assembly is larger than a charging cut-off current; and when adjusting the first supply power, adjust the first supply power to be larger than the charging cut-off current in response to the supply current of the first charging assembly being larger than the charging cut-off current.

15. The electronic device according to claim 9, wherein the computer program, when executed by the processor, further cause the electronic device to:

obtaining an output power of the external power supply; and when configuring the first supply power and the second supply power, configure the first supply power and the second supply power in response to the output power of the external power supply being larger than or equal to a total power of loads such that a ratio of the first supply power to the second supply power equals an initial power ratio.

16. The electronic device according to claim 9, wherein:

the condition is a first condition; and the computer program, when executed by the processor, further cause the electronic device to:

in response to the first supply current and the second supply current meeting a second condition, keep the first supply power and the second supply power unchanged;

wherein the second condition includes:

the first supply current and the second supply current are both larger than a supply current threshold; or the first supply current and the second supply current are both less than or equal to the supply current threshold.

* * * * *